W. R. RIGHTOR.
Elevators.
No. 140,076.  Patented June 17, 1873.
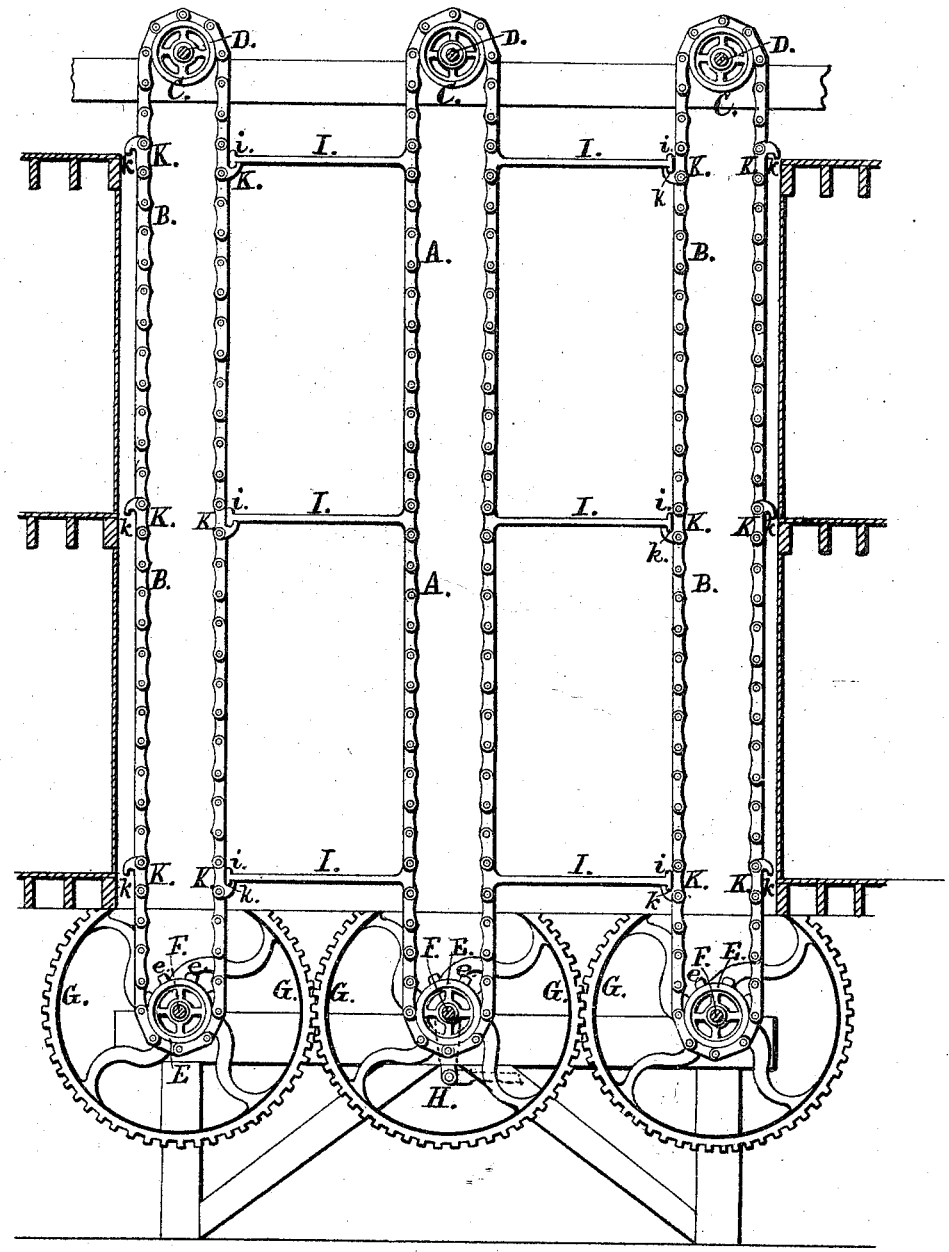
ATTEST:  
Jno Williams
INVENTOR:  
William R. Rightor  
By Knight Bro. Attys.

UNITED STATES PATENT OFFICE.

WILLIAM R. RIGHTOR, OF HELENA, ARKANSAS.

IMPROVEMENT IN ELEVATORS.

Specification forming part of Letters Patent No. 140,076, dated June 17, 1873; application filed April 30, 1873.

*To all whom it may concern:*

Be it known that I, WILLIAM R. RIGHTOR, of Helena, Phillips county, Arkansas, have invented a certain Improvement in Elevators, of which the following is a specification:

My invention relates to a continuous elevator or hoisting apparatus; and consists in two or more pairs or sets of vertical endless chains, to one pair or set of which platforms are rigidly attached by one edge, the opposite edge of the platforms being supported, when the platform is in horizontal position, by cleats carried by one or more of the other pairs or sets of chains, as shown.

The drawing is a side elevation of my apparatus.

A B are endless chains, supported at the upper end by pulleys C upon shafts D, and passing, at the lower end, beneath pulleys E upon shafts F. The shafts F carry gear-wheels G, meshing together to insure the simultaneous rotation of the pulleys E. The gear-wheels G may, if preferred, be made of smaller diameter than shown, and two intermediate wheels be introduced between each two of them. H is a crank, that may be upon the end of either of the shafts F, but which is, preferably, upon the middle one, carrying chains A. The chains A and B may be in sets, containing more or less in number on each shaft, each chain of the set passing over a pulley, C, and under a pulley, E. The pulleys E are provided with sprocket-lugs e, or other means to prevent the slipping of the chains, and thus insure simultaneous movement in all the chains. The platforms I are firmly secured at one edge to the set of chains A, and their free edges should be furnished with down-turned lip or claws i, to engage in grooves k in the cleats K attached to the chains B.

The operation is as follows: The engine being started all the chains move simultaneously, and the platforms are carried upward on one side of the apparatus and downward upon the other. As each platform arrives at the upper pulleys C its free edge is raised from the cleat K, and it is swung over the pulleys of the chain A, maintaining a position radial to the shaft D of such pulleys; and as the platform arrives at a horizontal position a cleat, K, has been brought around to receive the free edge. So, in like manner, after the platform has passed the lower floor, it is carried around on the middle shaft F as a center, and on attaining a horizontal position in its upward movement a cleat, K, takes under the free end of the platform to give the necessary support.

The chains A B may be of any suitable construction, or strong belting may be used in their place. It will be observed that a set of two or more chains at each point, marked A and B on the drawings, is necessary to properly support the platform. These chains show singly in the side elevation or profile. There may be two or more chains in each set, according to the size of the platforms.

The position of the motive appliances in respect to the chains may be reversed and placed at the top instead of the bottom, and this arrangement would have peculiar value for use in mines or deep shafts of any kind.

I claim as my invention—

The combination of the endless chains A bearing the platforms I, and one or more endless chains, B, moving simultaneously with chains A and carrying supports K for the free edges of the platforms, substantially as set forth.

In testimony of which invention, I hereunto set my hand.

WM. R. RIGHTOR.

Witnesses:
SAM'L KNIGHT,
ROBERT BURNS.